United States Patent [19]

Tanaka et al.

[11] Patent Number: 4,892,266

[45] Date of Patent: Jan. 9, 1990

[54] MAGNETIC TAPE CASSETTE

[75] Inventors: Kimio Tanaka; Takateru Sato, both of Saku; Haruo Shiba, Komoro, all of Japan

[73] Assignee: TDK Corporation, Tokyo, Japan

[21] Appl. No.: 264,227

[22] Filed: Oct. 28, 1988

[51] Int. Cl.⁴ ............................................. G11B 23/04
[52] U.S. Cl. ...................................... 242/199; 360/132
[58] Field of Search ................................ 242/197–200; 360/60, 132

[56] References Cited

U.S. PATENT DOCUMENTS 4,618,060  10/1986  Tarter .............................. 360/60 X Primary Examiner—David Werner
Attorney, Agent, or Firm—Seidel, Gonda, Lavorgna & Monaco

[57] ABSTRACT

A magnetic tape cassette comprises upper and lower half members for housing hubs with a magnetic tape wound therearound, provided with guide rollers and tape guides for guiding said magnetic tape in the front portion of the tape cassette, and a separate rear member including a portion for preventing erasure by mistake and a portion for detecting the kind of a tape. Provided at the rear edges of said upper and lower half members, and said rear member is coupled to the rear edges of said upper and lower half members by coupling means.

6 Claims, 4 Drawing Sheets

MAGNETIC TAPE CASSETTE

BACKGROUND OF THE INVENTION

1. Field of the Invention

This relates to a magnetic tape cassette, and more particularly to a structure of a magnetic tape cassette.

2. Description of the Prior Art

In a magnetic tape cassette, in general, as shown in FIGS. 10 through 12, a hub 1 around which a magnetic tape is wound and slidable sheets (not illustrated) disposed on upper and lower surfaces of said hub, respectively, are housed between upper and lower half members 3 and 5. Further, in the front portion of the magnetic tape cassette, guide rollers and tape guides 7 for guiding said magnetic tape are provided. In the rear portion of the magnetic tape cassette, holes 4 are provided with claws 2 for preventing erasure by mistake and holes 6 are provided for detecting the kind of a tape. The holes 6 for detecting the kind of a tape are different in their positions, shapes and dimensions according to the kind of a tape. Moreover, the rear surface portion of the magnetic tape cassette which includes holes 4 and 6 are monobloc-formed with the other portion which does not include the holes. Accordingly, on the occasion of injection molding of the above-described magnetic tape cassette, an exclusive mold for injection molding is necessary for each kind of tape. However, since such an exclusive mold for injection molding is expensive, waste in production cost and deterioration of efficiency are inevitable especially in the case of small production of many products. Further, since the holes 6 are formed at the same time of forming holes 4 in the upper and lower half members 3 and 5 of the above-described magnetic tape cassette, the surrounding walls of the holes 4 and 6 produce portions having complicated shapes and thick portions at the rear surface portion. This causes generation of shrink marks on the surface of the case. This is accompanied by rejects of cases relative to shape and accuracy, and often affects the functions and characteristics of cassettes.

SUMMARY OF THE INVENTION

It is an object of the present invention to provide a magnetic tape cassette in which a rear surface portion of a magnetic tape cassette including a portion for preventing erasure and a portion for detecting the kind of a tape is made as a rear member separatable from other portions of the cassette.

It is another object of the present invention to provide a magnetic tape cassette formed from a material different from that of the other portion, which includes a means for preventing erasure by mistake and a means for detecting the kind of a tape.

It is still another object of the present invention to provide a magnetic tape cassette colored with a color tone different from that of the other portion, which includes a means for preventing erasure by mistake and a means for detecting the kind of a tape.

According to the present invention, a magnetic cassette having a front and rear portion is provided comprising: (1) upper and lower half members defining a housing having a front end and a rear end wherein the front end of the housing is also the front portion of the tape cassette, (2) a pair of rotary hubs for winding a magnetic tape therearound, (3) guide rollers and tape guides provided on the upper and lower half members for guiding the magnetic tape from one of the rotary hubs to the other by way of the front portion of the tape cassette, (4) a rear member having a front end and a rear end wherein the rear end of the rear member is also the rear portion of the tape cassette, and wherein the rear end of the rear member includes a means for preventing erasure by mistake and a means for detecting the composition of the magnetic tape, and (5) coupling means for coupling the rear end of at least one of the upper and lower half members to the front end of the rear member.

In the magnetic tape cassette of the present invention, by simply interchanging three types of rear members, each having holes for detecting a different kind of tape corresponding to each of the three detection positions, i.e., normal position, high position and metal position, it is possible to provide three different kinds of magnetic tape cassettes. Consequently, instead of using an expensive exclusive mold conventionally used for monobloc injection molding of magnetic tape cassettes, a smaller and less expensive mold for the different configurations of the rear members can be used. Therefore, by the implementation of this invention, it is possible to effectively adapt to small production of many different kinds of magnetic tape cassettes. By another aspect of the present invention, deterioration of the function of cassettes due to shrink marks which have been generated on the front and rear portions of the upper and lower half members caused by thick portions formed inside the case, by rib portions of the above-described holes, or the like, can be prevented in advance. Further, whenever necessary, it is possible to form the rear member from a material and/or to color the rear member in a color tone different from the material and/or color of the upper and lower half members. Hence, improvement in torsion stiffness of the rear portion of the magnetic tape cassettes becomes possible as well as color identification of the kinds, lengths or the like of tapes.

DESCRIPTION OF THE PREFERRED EMBODIMENTS

Figure 1:
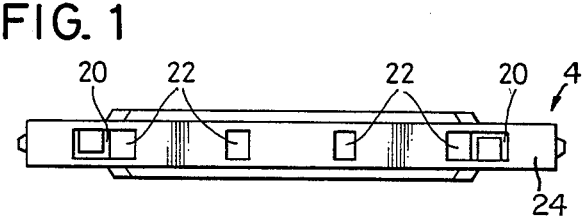
FIG. 1 is a rear elevation view of a mangetic tape cassette of one embodiment of the present invention.
Figure 2:
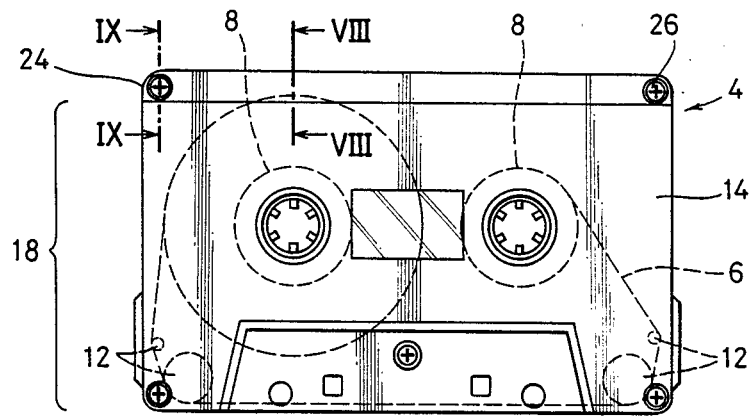
FIG. 2 is a planar view of the magnetic tape cassette in FIG. 1.
Figure 3:
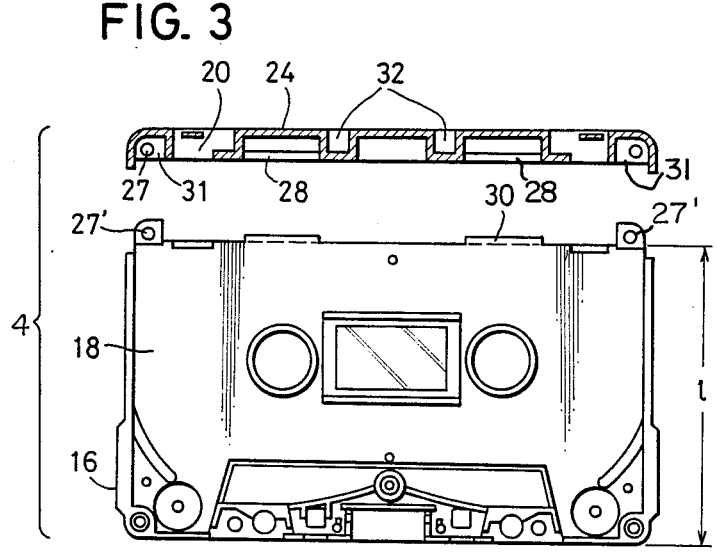
FIG. 3 is a planar view of lower half member and a cross-sectional view of the rear member and the magnetic tape cassette in FIG. 1.
Figure 4:
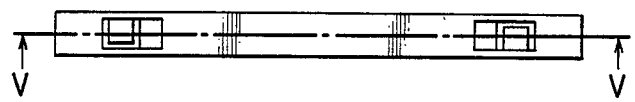
FIG. 4 is a rear elevation view of a rear member.
Figure 5:
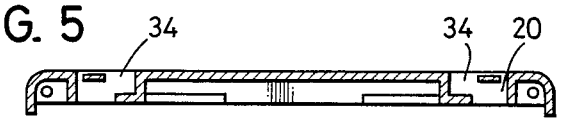
FIG. 5 is a cross-sectional view of the rear member in FIG. 4 taken along line V—V.
Figure 6:
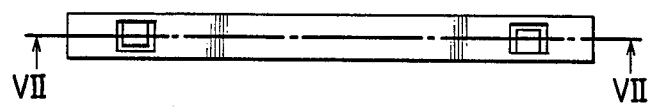
FIG. 6 is a rear elevation view of a rear member.
Figure 7:
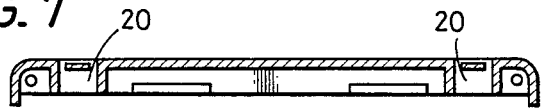
FIG. 7 is a cross-sectional view of the rear member in FIG. 6 taken along line VII—VII.
Figure 8:
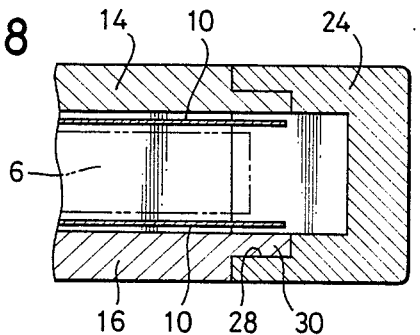
FIG. 8 is an enlarged cross-sectional view of the magnetic tape cassette in FIG. 2 taken along line VIII—VIII, illustrating a state of coupling of the rear member and the upper and lower half members.
Figure 9:
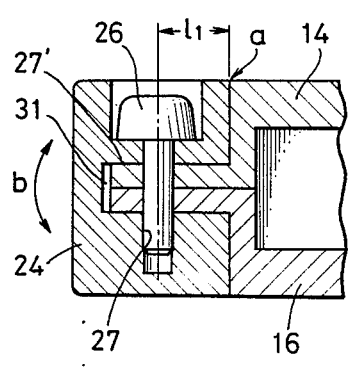
FIG. 9 is a cross-sectional view of FIG. 2 taken along line IX—IX, illustrating a coupling means.
Figure 10:
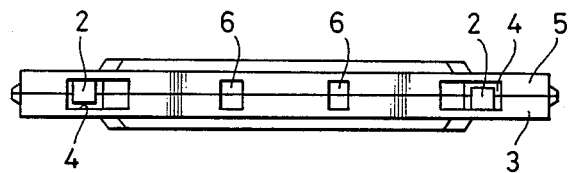
FIG. 10 is a rear elevation view of a prior art magnetic tape cassette.
Figure 11:
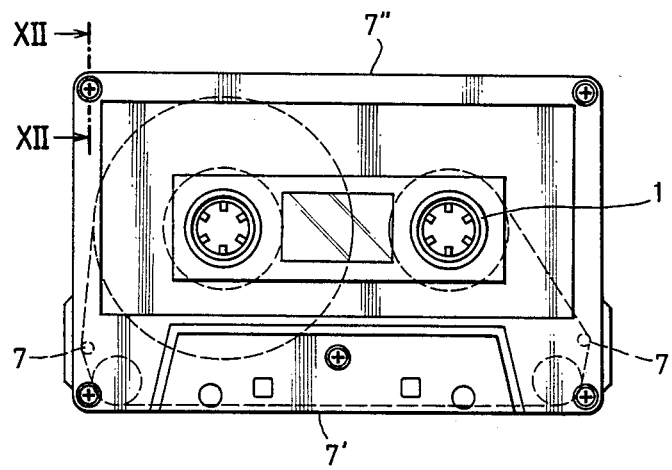
FIG. 11 is a planar view of the magnetic tape cassette in FIG. 10.
Figure 12:
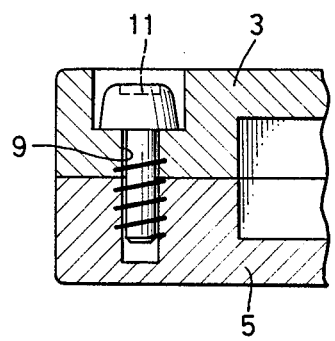
FIG. 12 is a cross-sectional view of the magnetic tape cassette in FIG. 11 taken along line XII—XII.
Figure 13:
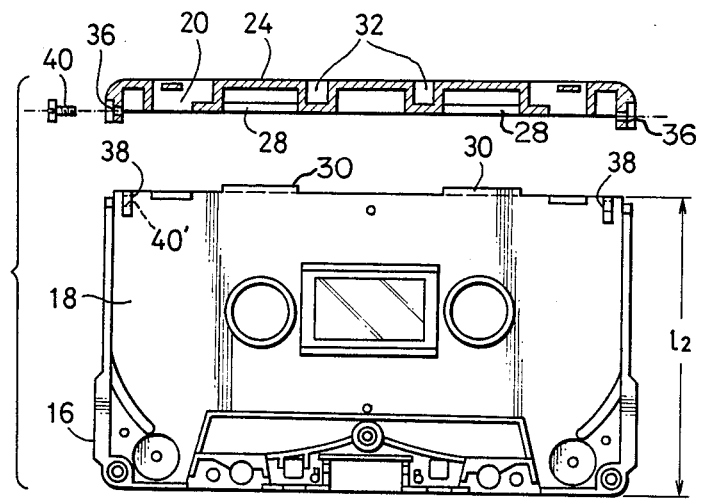
FIG. 13 is planar view of lower half members and a cross-sectional view of the rear member of another embodiment of the present invention.

The present invention will be hereinafter explained in detail with reference to the drawings. In FIGS. 1 through 3, a magnetic tape cassette 4 including a preferred rear member according to the first embodiment of the present invention is illustrated. The magnetic tape cassette 4 of the present invention is typically formed by unifying a tape-housing member 18 made from upper and lower half members for housing a magnetic tape 6, hubs 8 (shown in phantom) around which the magnetic tape 6 is wound, upper and lower slidable sheets (shown in phantom) which are disposed over and under the hubs 8, respectively, and tape guides 12 (shown in phantom) for guiding the magnetic tape parallel with and adjacent to the front portion of the cassette and a rear member 24 including holes 20 provided with claws for preventing erasure by mistake and holes 22 for detecting the kind of a tape metal tape, respectively, as best illustrated in FIG. 1, by fastening members, such as screws 26 as shown in FIG. 13. In more detail, as shown in the exploded view of FIG. 3, the magnetic tape cassette 4 of the present invention has a configuration of being divided in the above-described two members 18 and 24 at a predetermined distance 1 from the front surface portion to the rear surface portion and along the longer direction of the magnetic tape cassette 4. Recesses 28 are provided at the lower end of the rear member 24. Projections 30 are provided at the upper end of the tape-housing member, at a position corresponding to the recesses 28. Further, recesses 31 and tapped holes 27 are provided at opposite ends of the rear member 24. At the rear edges of the lower half member, there are provided ribs 27' which are dimensioned such that they fit into corresponding recesses 31. Ribs 27' include holes which, when ribs 27' are fitted into recesses 31, are aligned with the tapped holes 27. the upper half member (shown as item 14 in FIGS. 8 and 9) also has ribs which are similar in size, shape and configuration as ribs 27'. Upper member 14 lower member, 16 and rear member 24 are firmly unified to each other by fitting projections 30 into recesses 28 and by fitting ribs 27' into recesses 31, followed by securing screws 26 into tapping holes 27 as shown in FIGS. 2 and 9. In FIG. 3, the rear member 24 is exemplified as a type corresponding to metal tapes which includes recesses 32 for detecting metal position. Recesses 32 are located close to the center of the rear end of rear member 24. In addition to this, however, the rear member can be formed in two other configurations. The first one which includes (a) holes 20 provided with claws for preventing erasure by mistake and (b) holes 34 for detecting high position as illustrated in FIGS. 4 and 5. The second is one which corresponds to normal biased tapes which includes only holes and corresponding claws for preventing erasure by mistake as illustrated in FIGS. 6 and 7.

When upper half member 14, lower half member 16 and rear member 24 are screwed together as shown in FIG. 9, the distance $l_1$ from the unified position a to the position of the screw becomes large. Thus, the torsion stiffness in the direction shown by the arrow b becomes no more than that of the magnetic tape cassette of the structure, and the merit of a stiff material is lost. The problem of shrink marks being formed, as described earlier can result with an embodiment of the inventive tape cassette as shown in FIG. 2. Moreover, the presence of screws in the flat portion of the cassette, which is common in conventional practices, is not very desirable from the viewpoint of cosmetics. These problem are solved in the following embodiment of the present invention.

FIG. 13 illustrates a magnetic tape cassette according to the second embodiment of the present invention. In FIG. 13, like members as in the first embodiment are indicated by like reference numerals. Furthermore, the explanation of detail will be omitted. Holes 36 for threading screws acording to the present invention are provided on opposite side portions of the rear member 24. Lower half member 16 of the tape-housing member 30 has ribs 38 protruding therefrom which include tapped holes 40'. When the rear member 24 is slidably mounted to abut against the tape housing which is comprised of the upper half member 14 (not shown) and the lower half member 16, the recesses 28 of the rear member 24 and the projections 30 of the uper half member 14 (not shown) and the lower half member 16 are fitted into each other; and the holes 36 in the rear member 24 and the tapped holes 40' in the lower half member 16 are aligned. Screws 40 or the like are then passed through holes 36 and threaded into tapped holes 40' to firmly unify the rear member 24 to the lower half member 16 of the tape housing. Since in said rear member, the tapped holes can be provided at the side portions as described above, the distance from the center position of the screw at the side portion to the unified portion can be shorter than those instances where the screws are provided on the flat portion of the magnetic tape cassette as shown in FIGS. 2 and 9. Therefore, it is possible to efficiently utilize a high stiffness of said rear member.

While the present invention has been explained in reference to the two embodiments, it is to be noted that many modifications may be made within the scope of the present invention. In the above-described second embodiment, the rear member has been provided in the rear face portion of the cassette, but the rear member may also be provided in the front surface portion including the tape guiding member incorporating magnetic heads, and may be screwed to the body member according to the present invention.

What is claimed is:

1. A magnetic tape cassette having a front and rear portion comprising:
    (a) upper and lower half members defining a housing having a front end and a rear end, wherein the front end of said housing is also the front portion of said tape cassette,
    (b) a pair of rotary hubs having a magnetic tape wound therearound, wherein said hubs are rotatably housed in said housing,
    (c) guide rollers and tape guides provided on said upper and lower half members for guiding said magnetic tape from one of said hubs to the other of said hubs by way of the front end of said housing,
    (d) a rear member having a front end and a rear end, wherein the rear end of said rear member is also the rear portion of said tape cassette, and wherein the rear end of said rear member comprises a means for preventing erasure by mistake and a means for detecting the kind of magnetic tape wound around said hubs, and
    (e) coupling means for coupling the front end of said rear member to the rear end of said housing.

2. A magnetic tape cassette according to claim 1, wherein the coupling means comprises fitting means comprising:
(a) projection members and recess members formed at the rear ends of the upper and lower half members and
(b) corresponding recess members and projection members formed at the front end of said rear member.

3. A magnetic tape according to claim 1 wherein said rear member is formed by a material different from that of said upper and said lower half members.

4. A magnetic cassette according to claim 1 wherein said rear member has a color tone different from that of said upper and said lower half members.

5. A magnetic tape cassette according to claim 1 wherein said coupling means comprises at least one clamp means comprising:
(a) a first member on one side wall of said upper and said lower half members,
(b) a second member on said rear member in overlapping relationship with said first member, and
(c) means for clamping said first and said second members together.

6. A magnetic tape cassette according to claim 3, wherein said rear member is formed by a material having a stiffness greater than that of a material of said upper and lower half members.

* * * * *